United States Patent [19]

Meisel, Jr.

[11] Patent Number: 4,602,825
[45] Date of Patent: Jul. 29, 1986

[54] ANTI-TORSION MEANS FOR TRACK ASSEMBLIES FOR TRACK-TYPE VEHICLES

[75] Inventor: Thomas C. Meisel, Jr., Peoria, Ill.

[73] Assignee: Caterpillar Tractor Co., Peoria, Ill.

[21] Appl. No.: 278,274

[22] Filed: Jun. 29, 1981

Related U.S. Application Data

[63] Continuation of Ser. No. 99,142, Aug. 23, 1979, abandoned.

[51] Int. Cl.$^4$ .................. B62D 55/20; B62D 55/28
[52] U.S. Cl. .......................................... 305/11; 305/39; 305/47; 305/54
[58] Field of Search ............... 180/9.46, 9.5; 198/851, 198/852; 305/11, 39, 47, 49, 51, 53, 54, 57, 58 R, 58 PC

[56] References Cited

U.S. PATENT DOCUMENTS

| | | |
|---|---|---|
| 1,254,819 | 1/1918 | Leyner .......................... 180/9.46 X |
| 1,258,605 | 3/1918 | Novelius et al. . |
| 1,402,186 | 1/1922 | Stahl ..................................... 180/9.5 |
| 1,442,570 | 1/1923 | Holt . |
| 3,333,903 | 8/1967 | Orr et al. .......................... 305/57 X |
| 3,463,560 | 8/1969 | Reinsma et al. ..................... 305/11 |
| 3,601,212 | 8/1971 | Peterson et al. . |
| 3,815,962 | 6/1974 | Stedman et al. .................. 305/54 X |
| 3,913,986 | 10/1975 | Schaffner ......................... 305/39 X |
| 4,114,958 | 9/1978 | Boggs .............................. 305/57 X |
| 4,121,875 | 10/1978 | Stedman ................................ 305/39 |

FOREIGN PATENT DOCUMENTS 109050 3/1925 Switzerland .

Primary Examiner—David A. Scherbel
Attorney, Agent, or Firm—Phillips, Moore, Lempio & Finley

[57] ABSTRACT

A track assembly (11,11a) for a track-type vehicle comprises a plurality of wide low ground pressure track shoes (16) pivotally interconnected by a link assembly (17), disposed intermediate the widths of the track shoes (16). At least one chain (20) further interconnects the track shoes (16) and is disposed on an outboard end thereof. The chain (20) resists torsional loads imposed on the track assembly (11) which would otherwise cause damage to component parts thereof.

7 Claims, 9 Drawing Figures

ANTI-TORSION MEANS FOR TRACK ASSEMBLIES FOR TRACK-TYPE VEHICLES

This is a continuation of Ser. No. 99,142, filed Aug. 23, 1979, now abandoned.

TECHNICAL FIELD

This invention relates to a track assembly for track-type vehicles having wide low ground pressure (LGP) track shoes and means for resisting torsional loads imposed thereon.

BACKGROUND ART

A conventional track-type vehicle, such as a tractor, is mounted on a pair of endless track assemblies which include a plurality of pivotally interconnected track shoes. The track shoes are pivotally connected together by a link assembly disposed intermediate the width of the shoes and which includes pairs of laterally spaced links pivotally interconnected by pin and bushing assemblies. Upon operation of the vehicle the track shoes are subjected to severe torsional loads, particularly when relatively wide low ground pressure (LGP) track shoes are employed and the vehicles traverses uneven terrain wherein the track shoes engage rocks, stumps and the like. Such loading of the track shoes tends to bend them as well as to impose shear loads on the bolts which secure the track shoes to the link assembly.

Furthermore, such torsional loads are transmitted to the pin and bushing assemblies which tends to wallow-out the bushing bores and to cause pin drift. Should the forces imposed on the pin and bushing assemblies become too severe, the links may also be subjected to damage, such as cracking. Similar problems also arise with pin and bushing assemblies of the sealed and lubricated type wherein extraneous forces imposed thereon subject the assemblies to loss of lubricant. A related problem is one of track shoe interference whereby an end of one track shoe will deflect into engagement with an end of an adjacent track shoe to cause metal-to-metal contact therebetween to cause wear thereof.

Although the above problems are not readily apparent with respect to conventional track assemblies, having track shoes with relatively small widths, such problems become pronounced when a standard track shoe is substantially widened. The widened track shoe (LGP or low ground pressure track shoe) has found particular application when the vehicle is working over swampy or marshy ground conditions, such as during a logging operation. The floatation, traction and related operational characteristics of the vehicle are greatly aided with the use of the wider track shoes. However, the widened track shoes aggravate the above-mentioned problems since the cantilevered ends thereof, outboard of the link assembly, create substantial moments when forces are applied to the ends of the track shoes, such as when the track shoes engage a rock, tree stump, or the like. It should be further understood that since the outboard ends of the track shoes are disconnected from each other the reaction forces imposed on one track shoe will not be fully shared by the other track shoes.

Although the basic problem of transmitting high torsional loads to the track shoes and link assembly may be somewhat alleviated by "beefing-up" the component parts thereof, it should be obvious to those skilled in the arts relating hereto that such an approach has many economical and operating disadvantages, including those resulting from the substantial weight that must be added to the track assembly.

DISCLOSURE OF THE INVENTION

The present invention is directed to overcoming one or more of the problems as set forth above.

In one aspect of this invention, the track assembly of a track-type vehicle comprises a plurality of track shoes, link assembly means for pivotally interconnecting the track shoes together and disposed intermediate the widths thereof, and at least one anti-torsion means for pivotally interconnecting the track shoes together and for counteracting torsional loads imposed thereon. The vehicle's drive sprocket, idlers and track rollers are solely engaged with the link assembly means.

In another aspect of this invention, the anti-torsion means includes a plurality of single links pivotally interconnected together with each link being secured to a respective track shoe.

In still another aspect of this invention, a method is provided for replacing standard track shoes with wide low ground pressure track shoes having the above anti-torsion means attached thereto.

The anti-torsion means of this invention thus substantially solves the problem with respect to the usage of wide low ground pressure track shoes of counteracting the high torsional loads imposed on a track assembly which could otherwise cause: wallowing-out of the bushing bores; pin drift; link cracking; track shoe bending or breakage; and/or loosening or breakage of the bolts which secure the track shoes to the link assembly means. Furthermore, the anti-torsion means, since it interconnects the track shoes, resists deflection of one track shoe relative to an adjacent track shoe to prevent metal-to-metal contact and wear therebetween.

BRIEF DESCRIPTION OF THE DRAWINGS

Other objects of this invention will become apparent from the following description and accompanying drawings wherein.

BEST MODE OF CARRYING OUT THE INVENTION

Figure 1:
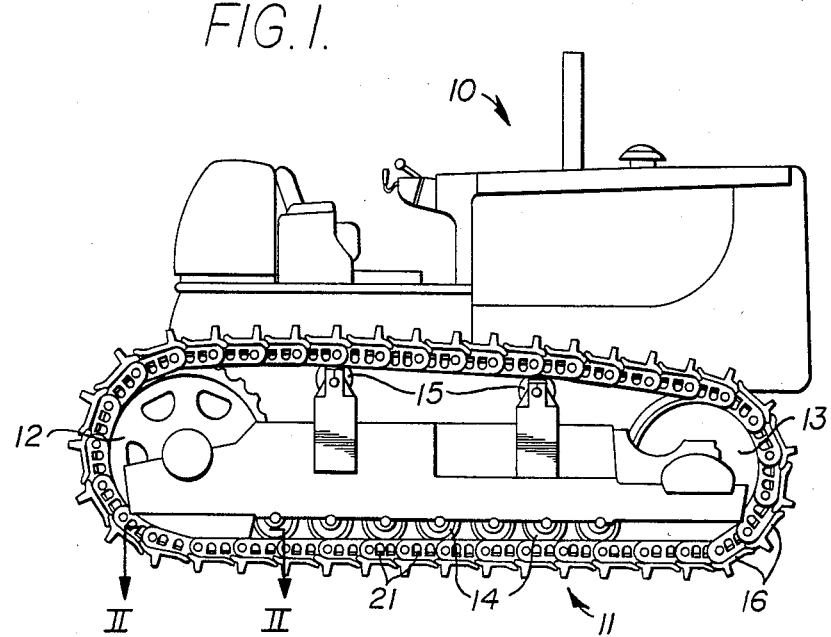
FIG. 1 is a side elevational view of a track-type tractor employing a track assembly embodiment of the present invention thereon.

FIG. 1 illustrates a track-type tractor 10 employing a pair of endless track assemblies 11 (one shown) of this invention thereon. Although the track assembly is particularly adapted for use on a tractor, it should be understood that the track assembly will find application to other vehicles, such as track-type excavators. In the tractor application illustrated in FIG. 1, each track assembly 11 is mounted in a conventional manner on a drive sprocket 12, an idler 13, a plurality of longitudinally spaced track rollers 14, and a pair of upper guide rollers 15, when needed.

Figure 2:
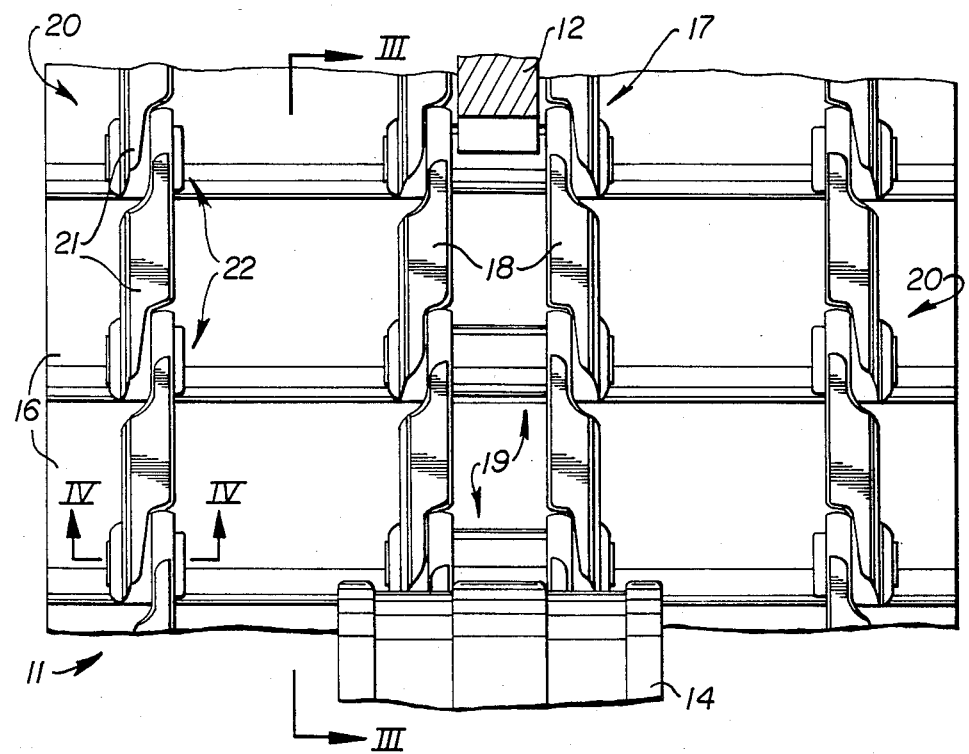
FIG. 2 is an enlarged top plan view partially illustrating the track assembly, generally taken in the direction of arrows II—II in FIG. 1, with parts removed for clarification purposes.
Figure 3:
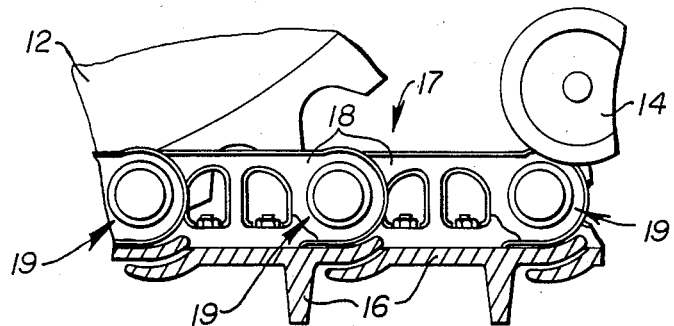
FIG. 3 is a sectional view through the track assembly, taken in the direction of III—III in FIG. 2.

Referring to FIGS. 2 and 3, track assembly 11 comprises a plurality of track shoes 16 which are pivotally interconnected by an articulated link assembly 17. Link assembly 17 is disposed intermediate the widths of track shoes 16 and includes a plurality of pairs of links 18, pivotally interconnected together by standard pin and bushing assemblies 19. The teeth of drive sprocket 12 engage the bushings of pin and bushing assemblies 19 to drive track assembly 11 in a conventional manner with the track assemblies being guided by idler 13 and rollers 14 and 15 which engage upper rail portions of links 18.

Track assembly 11 further comprises a pair of laterally spaced articulated chains 20 which provide antitorsion means for pivotally interconnecting track shoes 11 together and for counteracting torsional loads imposed thereon. It should be noted that drive sprocket 12, idler 13 and rollers 14 and 15 are solely engaged with link assembly 17. Each chain 20 comprises a plurality of single links 21, each of which is bolted or otherwise suitably secured to a respective track shoe 16.

Figure 4:
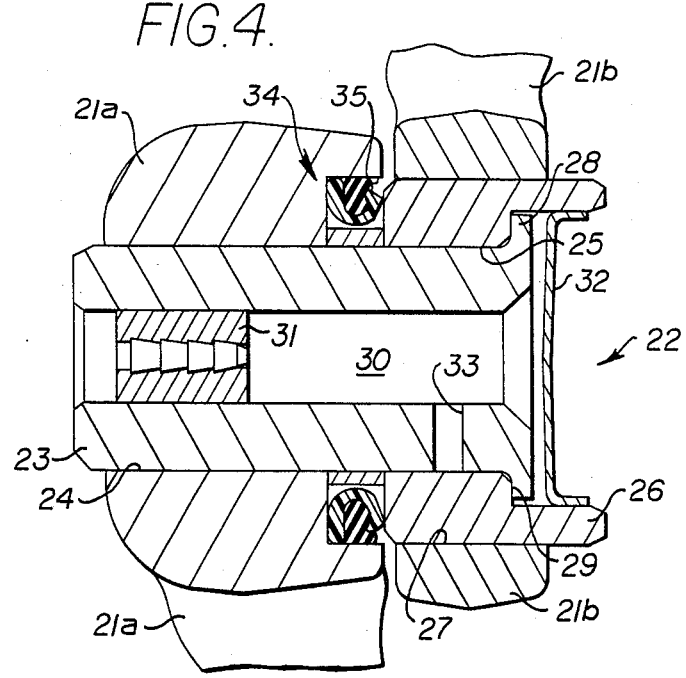
FIG. 4 is an enlarged sectional view through a lubricated and sealed pivot means employed in the track assembly, taken in the direction of arrows IV—IV in FIG. 2.

FIG. 4 illustrates a pivot means 22 for pivotally connecting each adjacent pair of links 21 together. Pivot means 22 may be of the sealed and lubricated type comprising a tubular pin 23, having a first end press-fitted or otherwise suitably secured within a bore 24 defined in a first link 21a. A second opposite end of pin 23 is slip-fitted in bearing relationship within a bore 25, defined in an annular bearing bushing 26. Bearing bushing 26 may be press-fitted or otherwise suitably secured within a bore 27, defined in a second, next adjacent link 21b, to thus pivotally connect links 21a and 21b together.

The second end of pin 23 has an annular flange 28 formed on the end thereof which seats within an annular recess 29, defined on bearing bushing 26. An oil cavity 30 is defined in pin 23 and is closed at one end by a plug 31, releasably secured in the pin, and closed at the other end by an annular cover 32 which is suitably releasably secured within bearing bushing 26. One or more radial ports 33 may be formed through the sidewall of pin 23 to communicate lubricating oil to the mating bearing surfaces of pin 23 and bearing bushing 26. A standard annular lip seal 34 is mounted in an annular recess 35, defined in link 21a, to prevent the ingress of contaminants within pivot means 22. As will be appreciated by those skilled in the art, other types of pivot means may be utilized in lieu of pivot means 22.

Figure 5:
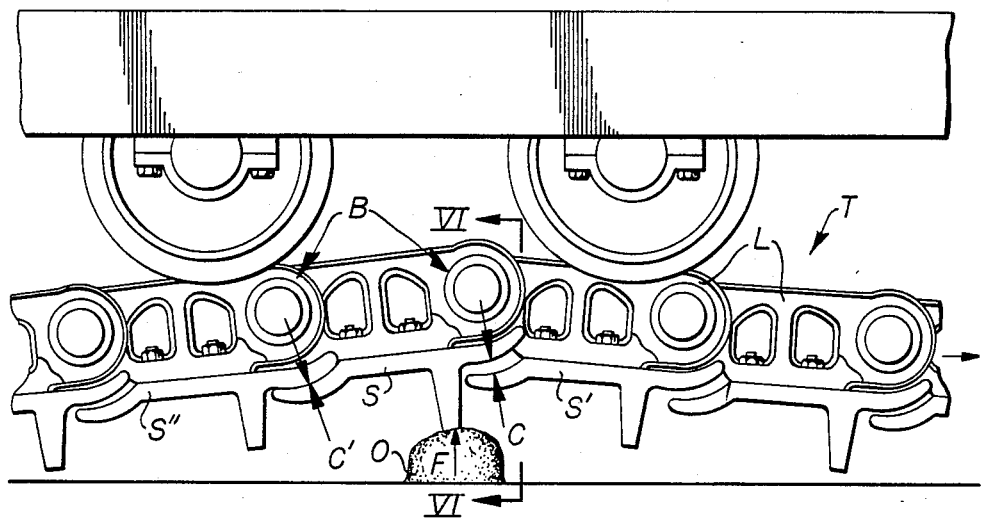
FIG. 5 is a partial side elevational view of a conventional track assembly showing the engagement of a track shoe thereof with a stationary object.
Figure 6:
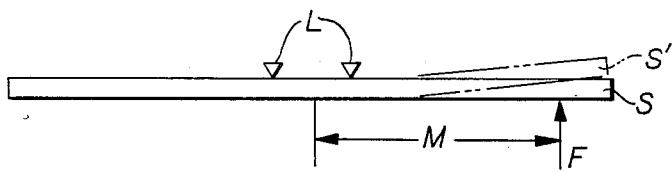
FIG. 6 schematically illustrates the reaction force and moment applied to the track shoe, as generally viewed in the direction of arrows VI—VI in FIG. 5.

FIG. 5 illustrates a conventional track assembly T having an end of a track shoe S thereof engaging a stationary object O, such as a rock. Track shoe S is of the low ground pressure type (LGP) having a greater width (e.g., 34 in.) than the width (e.g., 24 in.) of a standard track shoe. As schematically illustrated in FIG. 6, such track shoe engagement, assuming forward movement of the tractor in direction D, will impose a reaction force F on an end of a track shoe S to generally deflect and twist the track shoe, as illustrated by S'. Such deflection and twisting of track shoe S, both in its length and width directions, will separate the lug of engaged track shoe S with respect to the lug of a trailing track shoe S' to create a clearance C therebetween.

Such clearance is normally maintained at approximately 0.20 in. whereas testing has shown that clearance C in FIG. 5 will enlarge to approximately 1.0 in. when reaction force F is applied to an end of track shoe S. Furthermore, the leading edge of track shoe S will engage the trailing edge of leading track shoe S", as shown at C', to reduce the desired clearance to zero. Thus, while the trailing edge of track shoe S is unsupported, the leading edge thereof engages leading shoe S" in metal-to-metal contact therewith to not only place substantial loads on pin and bushing assemblies B of track assembly T, but to also place unduly high stresses on track shoes S and attendant parts of the track assembly.

The imposition of such loads on pin and bushing assemblies B will tend to wallow-out the bores of the bushings thereof and to also induce pin drift, breakage and/or scoring. These problems are particularly critical with respect to standard sealed and lubricated pin and bushing assemblies, the wear of which becomes greatly accelerated with the loss of lubricant. Also, links L and the bolts connecting them to track shoes S are subjected to extraneous forces which could adversely affect their service life.

Reaction force F also tends to subject track shoes S to bending and/or breakage. The interference effected between adjacent track shoes S and S" and illustrated at C' in FIG. 5 tends to accelerate the wear of the shoes, particularly at the overlapping lugs or lips thereof. Furthermore, bolts securing links L to track shoes S are subjected to loosening and possible breakage, primarily due to the tensional and shearing loads imposed thereon.

The above problems are, of course, substantially eliminated with respect to conventional track shoes wherein the width thereof is kept within acceptable short limits. However, when a standard track shoe is necessarily widened to accommodate certain operating and field conditions, moment arm M (FIG. 6) is substantially lengthened and track assembly T is accordingly subjected to forces of the type described above which could cause premature failure of the track assembly.

Figure 7:
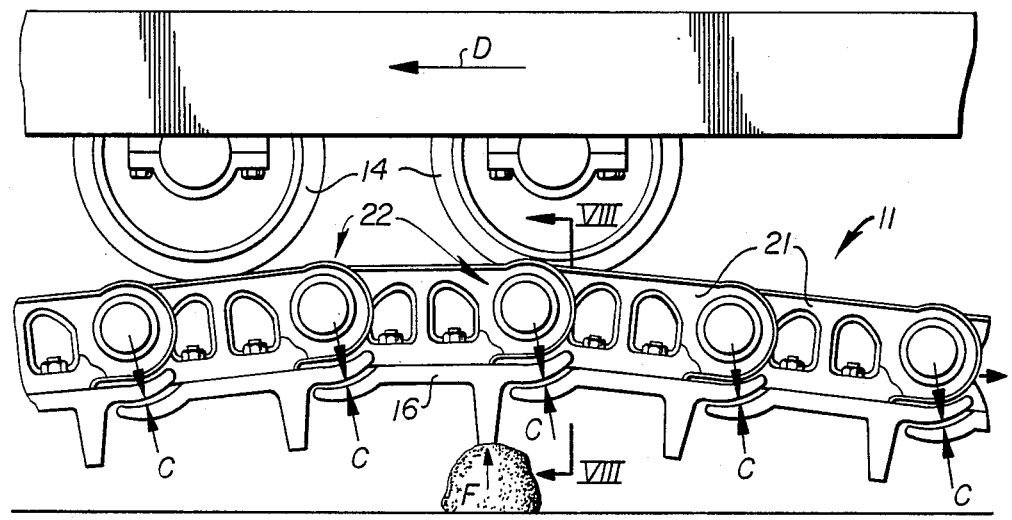
FIGS. 7 and 8 are views similar to FIGS. 5 and 6, respectively, but illustrating the track assembly embodiment of this invention.
Figure 8:
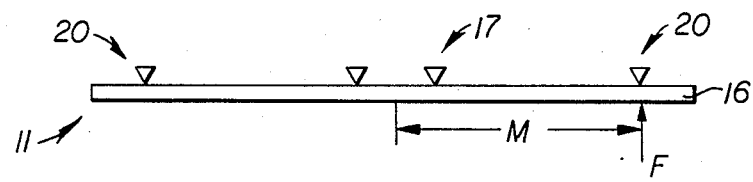

FIGS. 7 and 8 are views similar to 5 and 6, respectively, but illustrate application of a pair of anti-torsion means 20 of this invention to track assembly 11. Anti-torsion means 20 substantially reduce the above problems, discussed in connection with conventional track assembly T of FIGS. 5 and 6, including a dramatic reduction in the twisting of track assembly 11, substantial elimination of track shoe deflection and interference, and elimination of the unduly high torsional loading imposed on link assembly 17 (FIG. 2).

As shown in FIG. 7, a reaction force F created by engagement of a particular track shoe 16 with a stationary object O, such as a rock, will permit track shoes 16 to pivot relative to each other in a normal manner and in a horizontal plane, about bushing assemblies 22, due to the torsional rigidity added to track assembly 11 by anti-torsion means 20. The reaction force is thus absorbed and shared by a plurality of the interconnected track shoes 16. In this regard it should be noted that the clearance C between the leading and trailing ends of each pair of adjacent track shoes 16 is maintained substantially uniform throughout track assembly 11, i.e., approximately 0.20 in. Thus, the above enumerated problems with respect to the utilization of wide low ground pressure track shoes are substantially eliminated by this invention, i.e., undue torsional loading of track shoes 16 and link assembly 17 is virtually eliminated. It should be also noted that all known conventional track assemblies, wherein multi-link assemblies are used in association with track shoes, are primarily intended to fit a particular drive or roller system and do not address the problem of high moments resulting from forces being applied to the ends of wide low ground pressure track shoes.

INDUSTRIAL APPLICABILITY

Track assembly 11 finds particular application to track-type vehicles which are adapted to work over swampy or marshy ground conditions, such as those encountered in logging operations. Although track assembly 11 finds particular application to tractor 10 (FIG. 1), it should be understood that it may be used on other types of track-type vehicles, such as excavators.

As discussed above with particular reference to FIGS. 7 and 8, track assembly 11 will exhibit substantial torsional rigidity due to the construction and arrangement of anti-torsion means or chains 20 thereon. Upon the driving of sprocket 12 (FIG. 1), a plurality of track shoes 16 will substantially share and absorb any reaction loads imposed on track assembly 11. Track shoe clearances C (FIG. 7) are maintained substantially uniform throughout the length of track assembly 11 even when the end of a particular track shoe 16 engages an immovable object O, such as a rock. It should be noted that the ends of track shoes 16, disposed outboard of link assembly 17, are maintained in cantilevered relationship and that the link assembly is solely engaged by sprocket 12, idler 13, and rollers 14 and 15. It should be further noted that chains 20 provide some lateral protection to link assembly 17 to prevent objects from moving theretowards.

A commercial advantage of track assembly 11 of this invention is that track shoes 16 and attached chains 20 may be removed from link assembly 17 and replaced with standard, shorter width track shoes should the need arise. Thus, track shoes 16 and chains 17 of track assembly 11 may be considered as optional equipment for use on tractor 10. Furthermore, it may prove desirable in certain applications, wherein chain 20 is constructed in the form of link assembly 17 (double links 18 rather than single links 21), to replace worn links 18 with unworn links of chain 20 should the need arise. In particular, the upper or "rail" surfaces of links 18 do not engage with sprocket 12, idler 13, or rollers 14 and are thus not subjected to wear.

Figure 9:
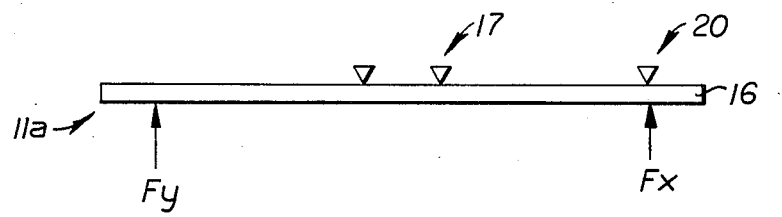
FIG. 9 is a schematic view similar to FIG. 8, but illustrating a modification of the track assembly embodiment of this invention.

FIG. 9 illustrates a modification 11a of track assembly 11 wherein one of the anti-torsion means 20 has been removed from the track assembly. As shown, a reaction force $F_x$, imposed on one end of a particular track shoe 16, is absorbed by the track assembly in substantially the same manner as described above, i.e., the single anti-torsion means 20 will provide substantial torsional rigidity to the track assembly. Furthermore, a reaction force $F_y$ applied to the opposite end of track assembly 11a, which does not have an anti-torsion means 10 secured thereon, would also be substantially absorbed by the track assembly due to the inherent torsional rigidity of the track assembly, afforded by anti-torsion means 20.

In view of the above, it can be seen that track assembly 11 of this invention, employing at least one anti-torsion means 20 therein, will substantially increase the torsional rigidity of the track assembly over conventional track assemblies wherein wide low ground pressure shoes 16 are employed. Thus, track assembly 11 will exhibit a prolonged service life over conventional track assemblies (FIG. 5) of this type and is adapted for expeditious conversion to a standard track assembly having shorter shoes.

Other aspects, objects, and advantages of this invention can be obtained from a study of the drawings, the disclosure, and the appended claims.

I claim:

1. In a track-type vehicle of the type having an endless track assembly (11), drive sprocket means (12) for driving said track assembly (11), idler means (13) for engaging and guiding said track assembly (11), and at least four closely and longitudinally spaced track roller means (14) for engaging said track assembly (11), the improvement wherein said track assembly (11) comprises a plurality of wide low ground pressure track shoes (16), leading and trailing edges of each pair of adjacent track shoes (16) being disposed in overlapping relationship relative to each other, link assembly means (17) for pivotally interconnecting said track shoes (16) together and disposed intermediate the widths thereof, said link assembly means (17) including a plurality of overlapping first links (18) having upper rail portions and pivotally interconnected together by first pivot means (19) each having a pivot axis, and a pair of anti-torsion means (20), mounted on opposite outboard ends of said track assembly (11), for pivotally interconnecting said track shoes (16) together and for counteracting torsional loads imposed on said track shoes (16) and on said link assembly means (17) by inducing said track shoes to share in the absorption of reaction forces imposed thereon and to maintain clearances between the leading and trailing edges of each pair of adjacent track shoes (16) substantially uniform during operation of said track assembly (11), each said anti-torsion means (20) including a plurality of second links (21) pivotally interconnected together by sealed and lubricated second pivot means (22) each having a pivot axis aligned laterally with a pivot axis of a respective one of said first pivot means (19), each of said drive sprocket means (12), said idler means (13), and said track roller means (14) being solely engaged with said link assembly means (17) and not with said anti-torsion means (20), said track roller means (14) being engaged along said upper rail portions of said first links (18) at a location above the pivot axes of said first pivot means (19).

2. The track-type vehicle of claim 1 wherein said second links (21) include a plurality of single links each secured to a respective one of said track shoes (16).

3. The track-type vehicle of claim 2 wherein said second pivot means (22) includes a pin (23) secured to one of a pair of said second links (21) and a bushing (26) secured to the other of said pair of second links (21), said pin (23) pivotally mounted in said bushing (26).

4. The track-type vehicle of claim 3 wherein said pin (23) has an oil cavity (30) defined therein and further including means (31,32) releasably secured to each of said pin (23) and said bushing (26) for sealing said oil cavity (30).

5. The track-type vehicle of claim 4 further comprising annular sealing means (34) for preventing ingress of contaminants within said pair of second links 21 and disposed axially between one of said pair of second links (21) and said bushing (26).

6. A low ground pressure track assembly (11) comprising a plurality of wide low ground pressure track shoes (16), leading and trailing edges of each pair of adjacent track shoes (16) being disposed in overlapping relationship relative to each other, link assembly means (17) for pivotally interconnecting said track shoes (16) together and disposed intermediate the widths thereof, said link assembly means (17) including a plurality of overlapping first links (18) having upper rail portions and pivotally interconnected together by first pivot means (19) each having a pivot axis, and a pair of anti-torsional means (20) mounted on opposite outboard ends of said track assembly (11), for pivotally interconnecting said track shoes (16) together and for counteracting torsional loads imposed on said track shoes (16) and on said link assembly means (17) by inducing said track shoes to share in the absorption of reaction forces imposed thereon and to maintain clearances between the leading and trailing edges of each pair of adjacent track shoes (16) substantially uniform during operation of said track assembly (11), each said anti-torsion means (20) including a plurality of single second links (21) having overlapping ends disposed in side-by-side relationship and pivotally interconnected together by sealed and lubricated second pivot means (22) each having a pivot axis aligned laterally with a pivot axis of a respective one of said first pivot means (19) and wherein said upper rail portions are disposed at a location above the aligned pivot axes of said first (19) and second (22) pivot means.

7. The track assembly (11) of claim 6 wherein said first links (18) and said second links (21) are each secured to a respective one of said track shoes (16).

* * * * *